(12) United States Patent
Dogaru

(10) Patent No.: US 8,917,947 B2
(45) Date of Patent: Dec. 23, 2014

(54) SELECTIVE PREDICTOR AND SELECTIVE PREDICTIVE ENCODING FOR TWO-DIMENSIONAL GEOMETRY COMPRESSION

(75) Inventor: Victor Dogaru, Alameda, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/528,672

(22) Filed: Jun. 20, 2012

(65) Prior Publication Data

US 2012/0275719 A1    Nov. 1, 2012

Related U.S. Application Data

(62) Division of application No. 11/678,570, filed on Feb. 23, 2007, now Pat. No. 8,249,371.

(51) Int. Cl.
| | |
|---|---|
| G06K 9/46 | (2006.01) |
| H04N 19/50 | (2014.01) |
| G06T 17/05 | (2011.01) |
| G06T 9/00 | (2006.01) |

(52) U.S. Cl.
CPC .......... *G06T 9/001* (2013.01); *H04N 19/00569* (2013.01); *G06T 17/05* (2013.01)
USPC ............ 382/238; 382/232; 382/244; 382/253

(58) Field of Classification Search
USPC .......................................... 382/232, 238, 244
See application file for complete search history.

(56) References Cited

U.S. PATENT DOCUMENTS

| | | | |
|---|---|---|---|
| 4,371,895 A | 2/1983 | Koga | |
| 4,460,923 A | 7/1984 | Hirano et al. | |
| 5,089,887 A | 2/1992 | Robert et al. | |
| 6,047,088 A | 4/2000 | van Beek et al. | |
| 6,167,159 A | 12/2000 | Touma et al. | |
| 6,337,657 B1 | 1/2002 | Zhodzishsky et al. | |
| 6,487,516 B1 | 11/2002 | Amorai-Moriya | |
| 6,618,441 B1 | 9/2003 | Hasegawa | |
| 6,760,479 B1 | 7/2004 | Feria | |
| 6,831,637 B1 | 12/2004 | Mack | |
| 6,996,175 B1 | 2/2006 | Olivieri | |
| 7,023,919 B2 * | 4/2006 | Cho et al. .................. | 375/240.16 |
| 7,912,299 B2 * | 3/2011 | Arcas et al. .................... | 382/232 |
| 2002/0122035 A1 | 9/2002 | Ng | |
| 2003/0072374 A1 | 4/2003 | Sohm | |
| 2003/0113024 A1 | 6/2003 | Feria et al. | |
| 2003/0215014 A1 * | 11/2003 | Koto et al. ............... | 375/240.16 |
| 2005/0243926 A1 * | 11/2005 | Hubrich et al. .......... | 375/240.16 |

(Continued)

OTHER PUBLICATIONS

An improved TIN—triangulation, Kim et al., Computer graphics and applications, 1999, pp. 118-125.*

(Continued)

*Primary Examiner* — Jayesh A Patel
(74) *Attorney, Agent, or Firm* — Sughrue Mion, PLLC

(57) ABSTRACT

A selective predictor utilizes a selective prediction method for coordinate data encoding. The selective predictor may calculate multiple prediction vectors for each vertex in the shape traversal order. Then, the selective predictor selects the vector that is closest to the vertex to be estimated. In determining the multiple prediction vectors, the selective predictor considers the position of several previous vertices in the traversal order. The selective predictor outputs a correction vector for the selected prediction vector and identification information indicting the selected prediction vector.

6 Claims, 6 Drawing Sheets

(56) References Cited

U.S. PATENT DOCUMENTS

| | | | |
|---|---|---|---|
| 2005/0243927 A1 | 11/2005 | Hubrich et al. | |
| 2006/0039472 A1 | 2/2006 | Barbarien et al. | |
| 2006/0228019 A1 | 10/2006 | Rahmes et al. | |
| 2006/0269158 A1 | 11/2006 | O'Hara et al. | |
| 2008/0031527 A1* | 2/2008 | Arcas et al. | 382/232 |

OTHER PUBLICATIONS

Chan et al., Experiments on Block-Matching Techniques for Video Coding, Multimedia Systems, vol. 2, 1994, pp. 228-241.*

Experiments on Block-Matching Techniques for Video Coding, Chan et al., Multimedia Systems, vol. 2, 1994, pp. 228-241.*

An improved TIN—traingulation. Yang-Soo Kim., Computer graphics and applications, 1999, pp. 118-125.*

An efficient motion vector—prediction, Kim et al. IEEE, 1057-7149, 1999, pp. 1117-1120.*

Michael Deering; "Geometry Compression"; Sun Microsystems; SIGGRAPH '95; 1995; pp. 13-20.

Gabriel Taubin, et al.; "Geometric Compression Through Topological Surgery", ACM Transactions on Graphics; Apr. 1998; pp. 84-115; vol. 17, No. 2.

Costa Touma, et al.; "Triangle Mesh Compression"; Graphics Interface '98 Conference Proceedings; 1998; pp. 26-34.

Calder et al.; "Selective Value Prediction", Proceedings of the 26th International Symposium on Computer Architecture, May 2-4, 1999, pp. 64-74, Atlanta, GA, USA.

Mokhtari et al.; "Multiscale Compression of Planar Curves Using Constant Curvature Segments", IEEE Proceedings, Fourteenth International Conference on Pattern Recognition, vol. 1, Aug. 16-20, 1998, pp. 744-746, Brisbane Qld.

Chan, et al., Experiments on block-matching techniques for video coding, Multimedia Systems, vol. 2 1994, pp. 228-241.

Isenurg, M., "Compressing Texture Coordinates with Selective Linear Predictions", University of North Carolina at Chapel Hill, Proceedings of the Computer Graphics International, 2003, 6 pages, IEEE Computer Society.

* cited by examiner

SELECTIVE PREDICTOR AND SELECTIVE PREDICTIVE ENCODING FOR TWO-DIMENSIONAL GEOMETRY COMPRESSION

This is a divisional application of U.S. application Ser. No. 11/678,570 filed on Feb. 23, 2007, in the U.S. Patent and Trademark Office, now U.S. Pat. No. 8,249,371. The entire disclosure of the prior application, U.S. application Ser. No. 11/678,570, now U.S. Pat. No. 8,249,371, is hereby incorporated by reference in its entirety.

FIELD

This disclosure relates generally to data encoding. Specifically, this disclosure relates to data encoding in geographic information systems.

BACKGROUND

Geographic Information Systems (GIS) are systems for creating, storing, analyzing, and managing geospatial data. GIS manage spatial coordinate data and associated attributes of the coordinate data. GIS typically include a computer system capable of integrating, storing, editing, analyzing, sharing, and displaying geographically-referenced information. GIS allow users to create interactive queries (user created searches), analyze the spatial information, and edit data.

As GIS become distributed and are required to handle larger data volumes, these systems require efficient storage and transport of geographic coordinate data. Efficient storage and transport play an important function in managing large amounts of data on centralized repositories, as well as on small devices where memory is often a limited resource, e.g. mobile phones, handheld devices, GPS navigators, etc. Greater efficiency can be achieved by encoding and compressing the spatial and coordinate data.

Currently, GIS utilize two methods to represent spatial data: raster and vector. Most often, raster data is an image. Vector data uses geometric shapes such as points, lines (series of point, or vertex coordinates), or polygons, to represent objects. For example, freeways may be represented as lines and property boundaries for a housing subdivision may be represented as polygons.

Current popular vector data compression algorithms use predictive coding techniques to compress quantized vertex coordinates. Prediction techniques apply directly to geometry data compression without regard to the geometry coordinates' format, such as GIS binary formats or text/XML documents such as Geography Markup Language (GML).

When using prediction, instead of specifying coordinates, only offsets between predicted and real coordinate values are considered for further coding. Conventionally, encoding two-dimensional (2D) spatial shapes, such as lines and polygons, involves a predictor that takes into consideration only the last or previous vertex in the order of traversal, and considers the predicted vertex to be identical to the previous vertex. This prediction may be termed simple prediction, or delta coding. In simple prediction, the correction transmitted is always the difference between the current and the previous vertex. The simple prediction encoding is attractive because of simplicity in implementation. However, the simplicity reduces the compression rates achieved by simple prediction.

BRIEF DESCRIPTION OF THE DRAWINGS

The accompanying drawings, which are incorporated in and constitute a part of this specification, illustrate embodiments of the disclosure and together with the description, serve to explain the principles of the present disclosure.

DETAILED DESCRIPTION

In a predictor using simple prediction encoding, only correction vectors between predicted and real coordinate values are considered for further coding. In a simple prediction scheme, the estimate of the current vertex position is identical to the previous vertex in the shape traversal order. However, this assumption ultimately reduces the compression rates achieved by simple prediction because of the large correction vectors that result.

According to embodiments of the present invention, a selective predictor determines multiple prediction estimates that are based on several previous vertices and selects one of them. In particular, the selective predictor may calculate multiple prediction vectors for each vertex in the shape traversal order. In determining the multiple prediction vectors, the selective predictor considers the position of several previous vertices in the traversal order. Then, the selective predictor selects the vector that is closest to the current vertex. For example, the selective predictor determines an error for each prediction vector to the current vertex being encoded and selects the prediction vector that has the smallest error.

The selective predictor outputs the correction vector for the selected prediction vector and identification information indicating that selected prediction vector. By considering multiple prediction estimates, the selective predictor can minimize the prediction error. As such, the selective predictor uses smaller correction vectors overall and hence fewer bits are needed to encode these vectors. This allows spatial data to be handled and distributed more efficiently.

Reference will now be made in detail to the exemplary embodiments of the present disclosure, an example of which is illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments. These embodiments are described in sufficient detail to enable those skilled in the art to practice the embodiments and it is to be understood that other embodiments may be utilized and that changes may be made without departing from the scope of the present disclosure. The following description is, therefore, merely exemplary.

Figure 1:
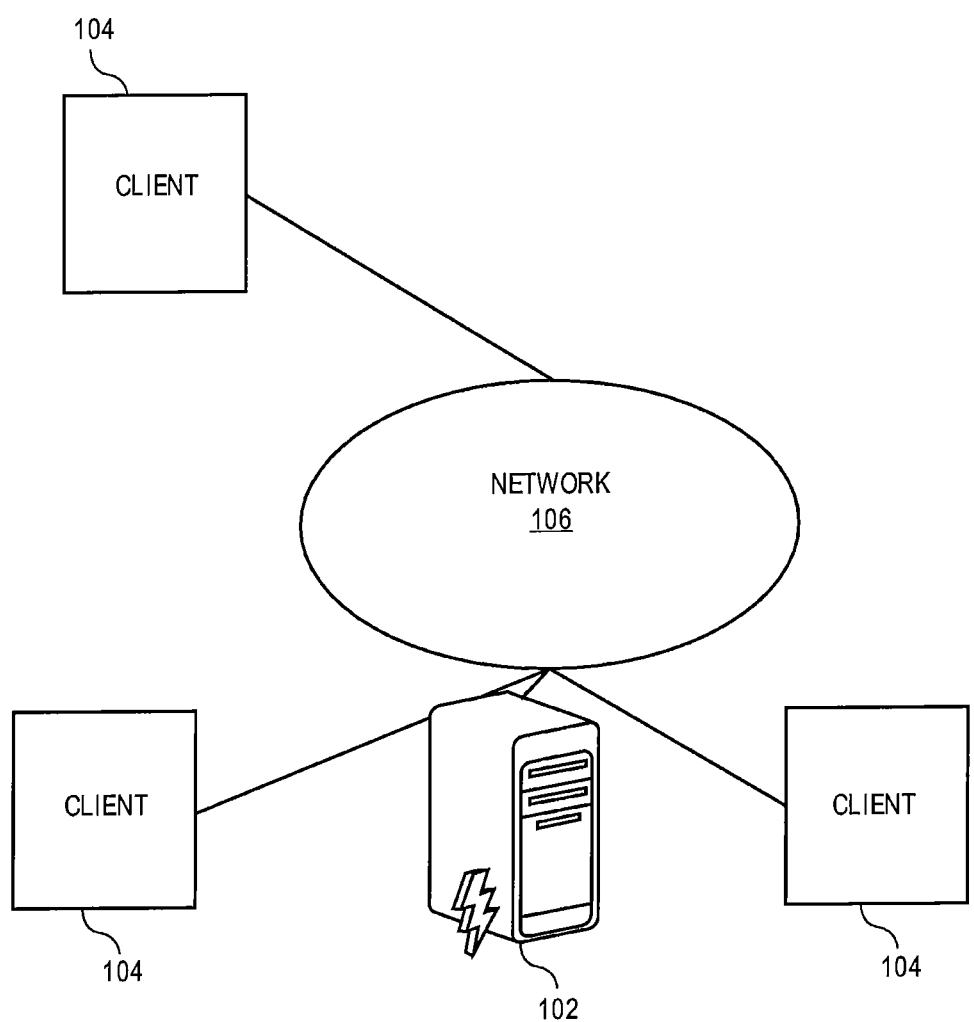
FIG. 1 is a diagram of a system consistent with embodiments of the present disclosure.

FIG. 1 is a diagram illustrating a network system 100 in which a selective predictor may encode and decode coordinate data. As shown, system 100 may include a server 120 and clients 104. Server 102 and clients 104 may be interconnected via a network 106. Network 106 may be any type of network such as an internet, the Internet, a wide area network, or a local area network. FIG. 1 shows system 100 including three clients and one server connected via a single network. One skilled in the art will realize, however, that system 100 may include any number of clients and servers connected via multiple networks.

Server 102 and client 104 may include applications for integrating, storing, editing, analyzing, sharing, and displaying geospatial data. Geospatial data generally refers to a class of data that has a geographic or spatial nature. For example, server 102 and clients 104 may handle geospatial data that identifies the geographic location and characteristics of natural or constructed features and boundaries on the earth. This information may be derived from, among other things, remote sensing, mapping, and surveying technologies.

In order to handle and share geospatial data, server 102 and clients 104 may include in their applications an encoder/decoder (i.e. codec). This codec may implement a selective predictor, which is consistent with the principles of the present invention. For example, server 102 may serve as a website that is hosting applications for delivering geospatial data to clients 104. In some embodiments, server 102 may include spatial applications and solutions provided by the IBM CORPORATION. The selective predictor may be part of the spatial codec in these applications and solutions. Accordingly, server 102 may use a selective predictor for encoding the geospatial data into a format that can be efficiently distributed to clients 104 across network 106.

Additionally, clients 104 may include various applications, such as web browsers, for receiving the geospatial data from server 102. Accordingly, clients 104 may include a selective predictor for decoding the geospatial data received from server 102.

Server 102 and clients 104 may be implemented using well known hardware and software. For example, server 102 may be implemented with any known server platforms such as those from INTEL, ADVANCED MICRO DEVICES, HEWLETT-PACKARD, etc. One skilled in the art will realize that the above server systems are exemplary and server 102 may be implemented in any known platform.

Clients 104 may be implemented as personal computers, workstations, thin clients, thick clients, or other similar computing platforms. Clients 104 may also be implemented as mobile electronic devices. Mobile electronic devices may be any type of portable, mobile device, such as mobile or cellular phones, handheld devices, PDA devices, GPS navigators or similar devices. Clients 104 may use operating systems such as LINUX, WINDOWS, MACINTOSH or other available operating systems. One skilled in the art will realize that the implementations of clients 104 are exemplary and clients 104 may be implemented in any type of computer system.

Figure 2:
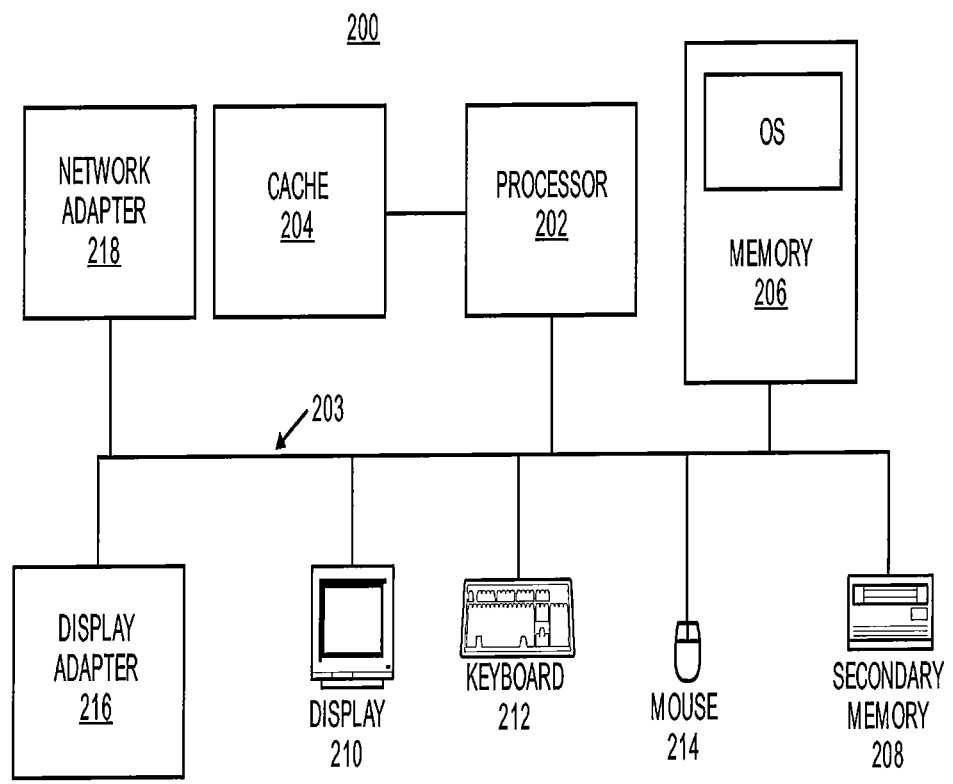
FIG. 2 is a diagram of a computing platform consistent with embodiments of the present disclosure.

FIG. 2 is a block diagram of an exemplary computing platform 200 for server 102 capable of performing embodiments of the present disclosure. The selective predictor may be implemented in an application written in program code and executed by the computing platform 200. The application may be implemented in computer languages such as PASCAL, C, C++, JAVA, HTML and the like.

As shown in FIG. 2, the computing platform 200 for server 102 may include one or more processors 202. Processor 202 may be connected to a cache 204 to serve as a working memory. Commands and data from the processor 202 may be communicated over a communication bus 203.

Server 102 may also include a main memory 206, such as a Random Access Memory (RAM), where the operating system and applications may be executed during runtime. Main memory 206 may also be coupled to communication bus 203.

Server 102 may include one or more secondary memories 208. Secondary memories may be coupled to communications bus 203. The secondary memories 208 may include, for example, a hard disk drive and/or a removable storage drive, representing a floppy diskette drive, a magnetic tape drive, a compact disk drive, and the like, where a copy of a computer program embodiment for applications including the selective predictor may be stored. The secondary memories 208 may read from and/or write to between themselves in a well-known manner.

If desired, server 102 may also include a keyboard 212, a mouse 214, and a display 210 for allowing a user or administrator to interface with server 102. Keyboard 212, mouse 214, and display 210 may be coupled to communications bus 203.

Server 102 may also include a display adapter 216. Display adapter 216 may be coupled to communication bus 203. Display adapter 216 can interface with the communication bus 203 and the display 210 and can receive display data from the processor 202 and converts the display data into display commands for the display 210.

Server 102 may include a network adapter 218. Network adapter 218 may be coupled to communication bus 203. Network adapter 218 may allow computing platform 200 to send and receive data via a network, such as network 106.

According to embodiments of the present disclosure, the selective predictor and methods of selective prediction may be embodied on a computer readable storage medium as instruction for causing a computer platform to perform the instructions. The computer readable storage medium may include storage devices and signals, in compressed or uncompressed form.

Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software programs of the computer program on a CD-ROM or via Internet download. In a sense, the Internet itself, as an abstract entity, is a computer readable medium. The same is true of computer networks in general.

Figure 3:
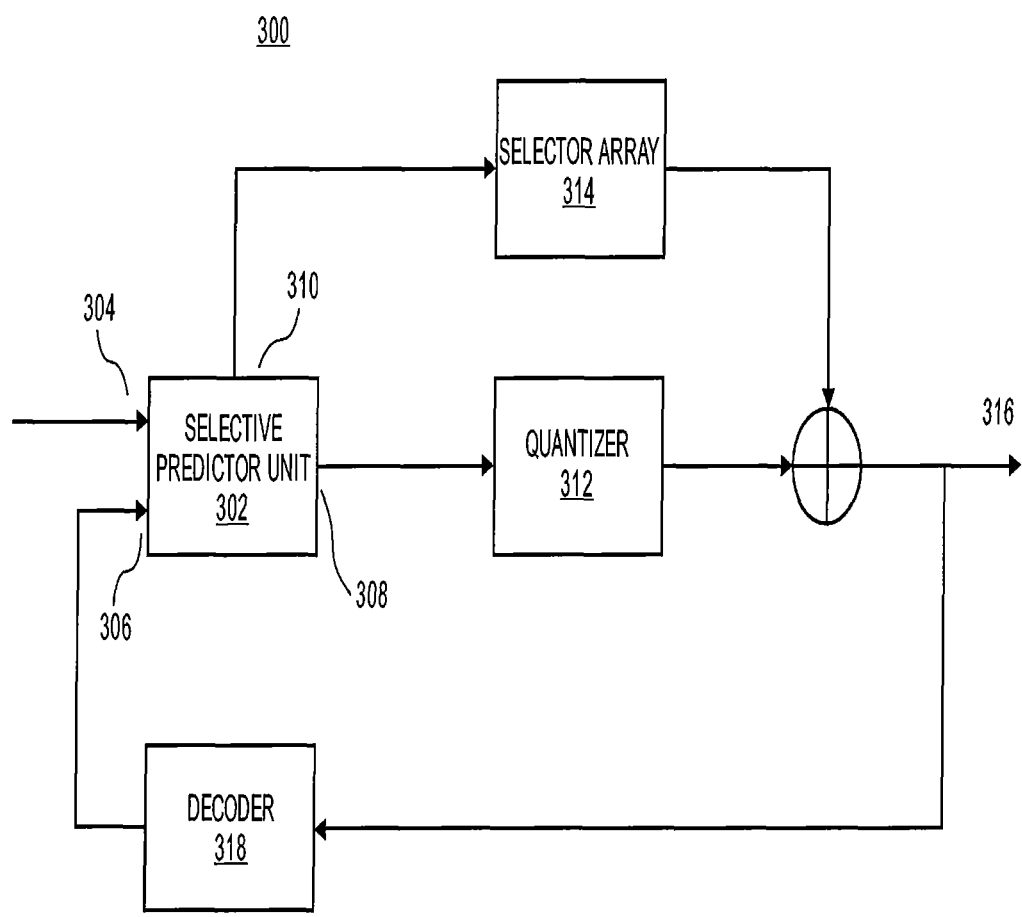
FIG. 3 is a diagram illustrating an exemplary selective predictor consistent with embodiments of the present disclosure.

FIG. 3 is a block diagram illustrating a selective predictor 300 for performing selective prediction encoding geospatial data consistent with principles of the present invention. Selective predictor 300 may be implemented in hardware, software, or a combination of both. For example, the components of selective predictor 300 may be implemented in code embodied on a computer readable storage medium as instruction for causing a computer platform to perform the instructions. FIG. 3 represents a generalized schematic illustration and one skilled in the art will realize that other components may be added or existing components may be removed or modified.

As illustrated in FIG. 3, selective predictor 300 includes a selective predictor unit 302. Selective predictor unit 302 encodes data by calculating multiple correction vectors for the coordinate data in the geospatial data. Selective predictor unit 302 determines multiple prediction vectors for each vertex in the shape traversal order. In determining the multiple prediction vectors, selective predictor unit 302 considers the position of several previous vertices in the traversal order. Then, selective predictor unit 302 determines the prediction vector that is closest to the vertex to be estimated and selects the determined prediction vector.

As its outputs, selective predictor unit 302 provides the selected prediction vector or the correction vector corresponding to the selected prediction vector. Selective predictor unit 302 also outputs identification information that indicates which prediction vector was selected.

Selective predictor unit 302 may include inputs, such as inputs 304 and 306, for receiving coordinate data. For example, input 304 may be configured to receive un-encoded coordinate data, such as from a geospatial data source or data from another application. Input 306 may be configured to receive encoded data, and thus, may be coupled to a decoder 318 to receive previous determined prediction vectors. One skilled in the art will recognize that inputs 304 and 306 may be combined into a single input, or implemented over multiple inputs based on the type of data to be received.

Selective predictor unit 302 may include one or more outputs to provide the encoded coordinate data. Selective predictor unit 302 may output identification information indicating which prediction vector was selected and a correction vector from this selected prediction vector. The selective predictor unit 302 may perform selective prediction for multiple vertices, and thus, 302 may determine and output an array of vector corrections and an array of identification information. Accordingly, selective predictor unit 302 may include an output 308 for outputting the selected prediction vector or the correction vector which is based on the selected prediction vector. Selective predictor unit 302 may also include an output 310 for outputting the identification information. One skilled in the art will recognize that outputs 308 and 310 may be combined into a single output, or implemented over multiple outputs.

Selective predictor unit 302 outputs the selected prediction vector or correction vector to quantizer 312. Quantizer 312 may divide chosen prediction correction vector into a single number, code or classification. Selective predictor unit 302 may output the identification information to a selector array 314.

Quantizer 312 and selector array 314 collect the correction vectors and identification information. Selective predictor 300 then combines the arrays and outputs the combined arrays to output 316.

Decoder 318 may perform decoding in order to provide selective predictor unit 302 with the previous predicted correction vectors. Decoder 318 may be coupled to the combined output of quantizer 312 and selector array 314 to receive the combined correction vectors and identification information. Alternatively, selective predictor 300 may include a memory (not shown) to serve as a cache or buffer of previous vertices and predicted correction vectors.

Figure 4:
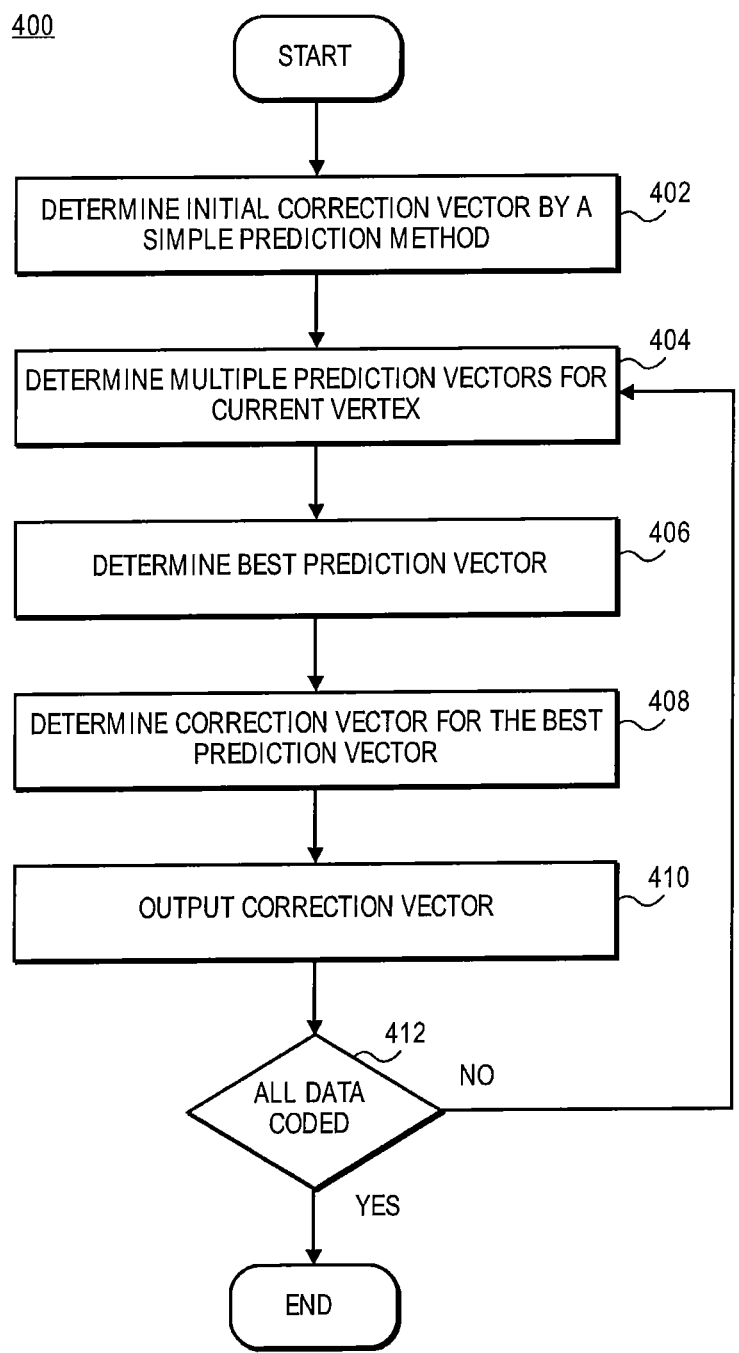
FIG. 4 is a flow diagram illustrating an exemplary method of selective prediction consistent with embodiments of the present disclosure.

FIG. 4 is a flow diagram illustrating an exemplary method 400 for performing a selective prediction according to embodiments of the present disclosure. According to method 400, a selective predictor may calculate multiple prediction vectors for each vertex in the shape traversal order. In determining the multiple prediction vectors, the selective predictor considers the position of several previous vertices vectors in the traversal order. Then, the selective predictor selects the prediction vector that is closest to the vertex to be estimated.

Method 400 may be implemented in any type of application, device, or system utilizing coordinate data. For example, method 400 may be performed by a selective predictor 300 included in system 100 described above. While method 400 will be described below as being performed on a selective predictor, one skilled in the art will realize that method 100 may be performed on any device, system or application in which spatial coordinate data is present.

Method 400 begins with selective predictor 300 determining the initial correction vectors for coordinate data in geospatial data by a simple prediction method (stage 402). The coordinate data may be any type of 2D coordinate data. For example, the coordinate data may be data of geometric shapes such as points, lines, or polygons. The geometric shapes may represent geospatial information, such as roads or borders.

The simple prediction method considers the predicted vertex to be identical to the previous vertex. The predicted vertex vector may be given by:

$$\vec{v}_k = \vec{v}_{k-1}$$

where $\vec{v}_k$ is the current vector for vertex k and $\vec{v}_{k-1}$ is the previous vertex vector.

In this case, the corrected vertex vector corresponds to the difference between the current vertex vector and the previous vertex vector. The correction vertex vector may be given by:

$$\vec{e}_k = \vec{v}_k - \vec{v}_{k-1}$$

where $\vec{e}_k$ is the current correction vector.

Figure 5:
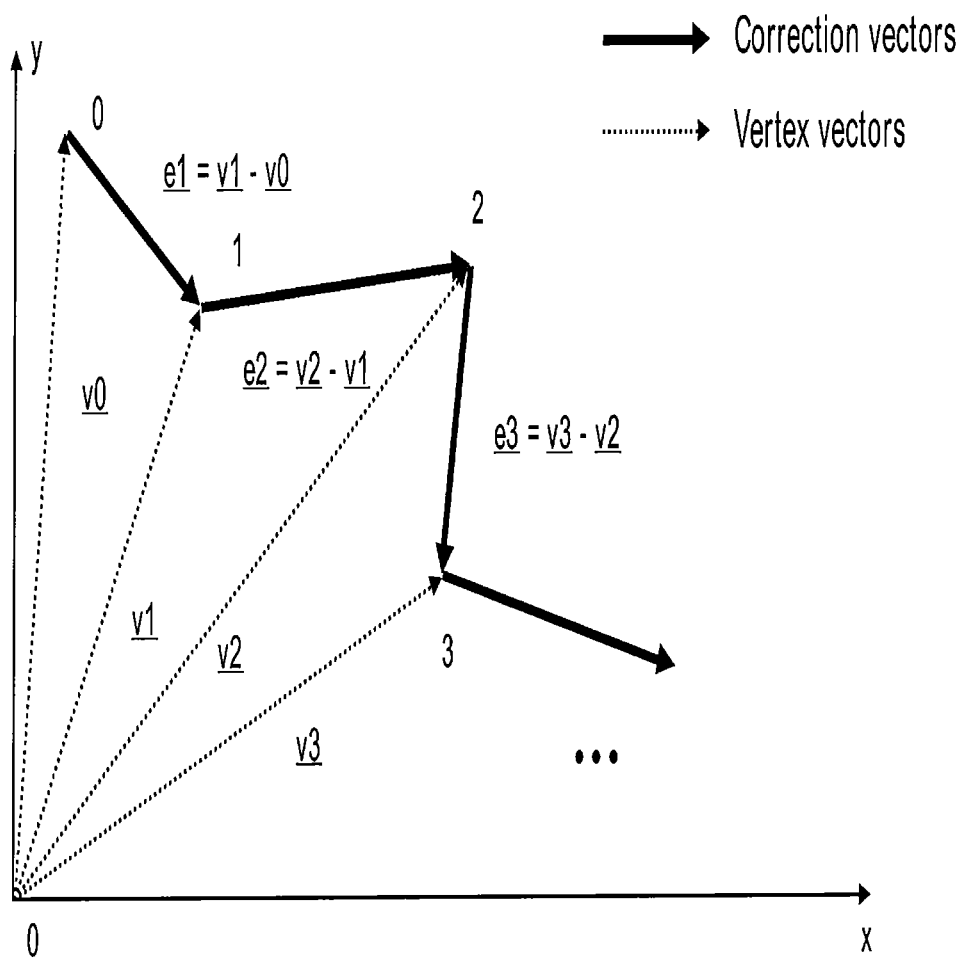
FIGS. 5 and 6 are diagrams illustrating the exemplary method of selective prediction consistent with embodiments of the present disclosure.

FIG. 5 is a diagram illustrating an exemplary stage 402 for determining three initial vectors in the traversal order according to the simple prediction method. As shown in FIG. 5, for each current vertex, the selective predictor determines the three initial vectors by setting the predicted vertex vector equal to the previous vertex vector. Accordingly, the correction vectors would be equal to:

$$\vec{e}_k = \vec{v}_1 - \vec{v}_0$$

$$\vec{e}_2 = \vec{v}_2 - \vec{v}_1$$

$$\vec{e}_3 = \vec{v}_3 - \vec{v}_2$$

where $\vec{e}_1$, $\vec{e}_2$, and $\vec{e}_3$ are correction vectors for vertices 1, 2, and 3 in the traversal order, respectively. As mentioned above, the simple prediction may be performed to determine three initial correction vectors. One skilled in the art will realize that the simple prediction may be performed to determine any number of initial correction vectors.

Referring now back to FIG. 4, after the initial correction vectors are determined, selective predictor 300 determines multiple selective prediction vectors for the next (current) vertex (stage 404). Selective predictor 300 determines the selective prediction vector by utilizing the previous initial vertex vectors. According to one embodiment, selective predictor 300 determines three selective prediction vectors by utilizing three previous initial vertex vectors. One skilled in the art will realize that selective predictor 300 may utilize any number of previous vertex vectors in determining the multiple prediction vectors.

In some embodiments, selective predictor 300 may be configured to predict a current vertex $v_k$ given previous vertices $v_{k-1}$, $v_{k-2}$ and $v_{k-3}$ by determining determine three prediction vectors. One skilled in the art will realize that selective predictor 300 may determine any number of multiple prediction vectors for a current vertex. In some embodiments, selective predictor 300 determines the prediction vectors by utilizing the following equations:

$$\vec{v}_k^0 = \vec{v}_{k-1}$$

$$\vec{v}'_k = \vec{v}_{k-1} - \vec{v}_{k-2} + \vec{v}_{k-3}$$

$$\vec{v}''_k = \vec{v}_{k-1} + \vec{v}_{k-1} - \vec{v}_{k-2}$$

$$\vec{v}'''_k = \vec{v}_{k-1} + \vec{v}_{k-2} - \vec{v}_{k-3}$$

where $\vec{v}'_k$, $\vec{v}''_k$, $\vec{v}'''_k$ are the three selective prediction vectors for the current vertex vector in the traversal order.

One skilled in the art will realize that the above equations are exemplary and that the initial vertex vertices may be combined in any manner to determine multiple predictors. Further, one skilled in the art will realize that selective predictor 300 may begin to determine the multiple prediction vectors at any position in the traversal order.

Figure 6:
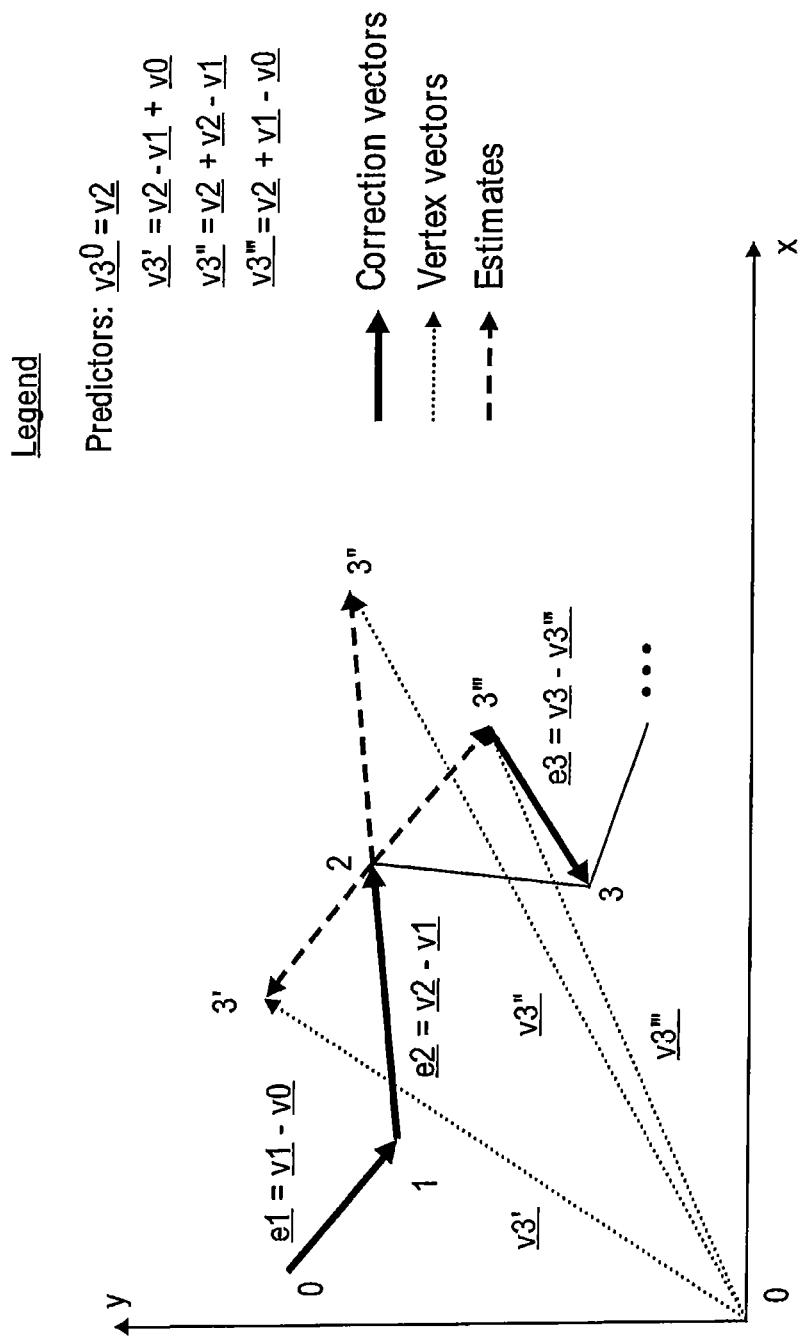

FIG. 6 is a diagram illustrating the operations of selective predictor 300 in encoding the position of a current vertex $v_k$ given previous vertices $v_{k-1}$, $v_{k-2}$ and $v_{k-3}$. As noted above, selective predictor 300 may initial calculate three correction vectors based on the known simple prediction method. Selective predictor 300 may then proceed with determining three prediction vectors. For example, for a current vertex $v_k$ and where k=3 in the traversal order, the three prediction vectors are given by:

$$\vec{v}^0_3 = \vec{v}_2$$

$$\vec{v}'_3 = \vec{v}_2 - \vec{v}_1 + \vec{v}_0$$

$$\vec{v}''_3 = \vec{v}_2 + \vec{v}_2 - \vec{v}_1$$

$$\vec{v}'''_3 = \vec{v}_2 + \vec{v}_1 - \vec{v}_0.$$

Next, referring now back to FIG. 4, the selective predictor determines the best prediction vector for the multiple prediction vectors (stage 406). The selective predictor determines the best prediction vector by choosing the prediction vector that is closest to the actual vertex. The best prediction vector is generally the prediction vector for which the difference $v_k - v_{k\ predicted}$ is minimal. The best prediction vector may be determined by the following equations:

$$\vec{v}_{k\_pred} = \vec{v}^i_k$$

$$\vec{e}^i_k = \min(\vec{v}_k - \vec{v}^i_k)$$

In the example shown in FIG. 6, the best prediction vector may be $\vec{v}'''_3$ and would be given by:

$$\vec{v}'''_3 = \vec{v}_2 + \vec{v}_1 - v_0$$

Then, the selective predictor determines the correction vector (stage 408). As show in FIG. 6, each correction vector is the vector of minimal length that starts at the tip of each predictor and ends at the vertex vector. As such, the correction vector may be given by:

$$e_k = \vec{v}_k - \vec{v}_{k\_pred}$$

where $\vec{v}_k$ is the current vector for vertex k and $\vec{v}_{k\_pred}$ is the best prediction vector.

Next, the selective predictor outputs the correction vector (stage 410). Additionally, the selective predictor may output information identifying which equation was utilized for the chosen prediction vector.

Then, the selective predictor determines if any additional data exist to be coded in the traversal order (stage 412). If more data exists, the selective predictor may perform the selective prediction according to stages 404-410 for the additional data.

If the coordinate data contains more than one position, the selective predictor may determine and output an array of vector corrections and an array of identification information of predictor selections. Additionally, the predictor identification information chosen for each vertex may be output in a separate array.

Optionally, the selective predictor may perform further compression on the correction vectors and identification information. For example, the array of correction vectors and identification information may be compressed using a simple run-length encoder. Additionally, the selective predictor may be trained by calculating a set of weight coefficients that would maximize the coding efficiency.

As a result of determining the best prediction vector, the correction vectors, on average, may be smaller than the ones generated using the simple prediction algorithm. As such, fewer bits are required to encode the correction vectors.

In particular, one skilled in the art will recognize that the average number of bits used to encode a value N is proportional to $\log_2 N$. If $A_k$ corresponds to the correction values generated by the selective predictor, and $B_k$ are the corrections generated by a conventional simple prediction, $A_k$ will always be M bits smaller or equal to $B_k$.

If $A_k$ is smaller by a factor of 2, then it may be encoded in a word that is M bits shorter than $B_k$. To this word, selective predictor 300 may then add the bits used to encode the predictor identification information, for example, 2 bits.

For a series of N vertices, the selective prediction efficiencies, E, of selective predictor 300 may be determined using the following equation:

$$E = \frac{1}{N} \sum_{k=1}^{N} \log_2\left(\left|\frac{B_k}{A_k}\right|\right) - 2$$

E is positive in the case where the selective predictor is more efficient than the simple prediction method.

As mentioned above, selective predictor 300 may be implemented in code embodied on a computer readable storage medium as instruction for causing a computer platform to perform the instructions. Table 1 illustrates exemplary code which may be implemented in selective predictor 300 for performing method 400 according to embodiments of the present invention.

TABLE 1

| Selective predictor unit | Decoder |
| --- | --- |
| for the first three vertices { | for the first three vertices { |
| Output.append(V0) | V0 = Input.next( ) |
| Selector.append(ZERO) | Selector.next( ) |
| Output.append(V1-V0) | V1 = Input.next( ) + V0 |
| Selector.append(ZERO) | Selector.next( ) |
| Output.append(V2-V1) | V2 = Input.next( ) + V1 |

TABLE 1-continued

| Selective predictor unit | Decoder |
|---|---|
|     Selector.append(ZERO)<br>}<br>while (more vertices) {<br>// calculate estimates<br>    Ek0 = Vk-1<br>    Ek1 = Vk-1 −Vk-2 + Vk-3<br>    Ek2 = Vk-1 + Vk-1 −Vk-2<br>    Ek3 = Vk-1 + Vk-2 −Vk-3<br>// calculate distances between estimates<br>and actual vertex<br>    d0 = distance(Vk, Ek0)<br>    d1 = distance(Vk, Ek1)<br>    d2 = distance(Vk, Ek2)<br>    d3 = distance(Vk, Ek3)<br>// transmit estimate that is closest to the<br>vertex and set estimate type in a selector<br>array<br>Ek = {Ekj \| dj = min(d0, d1, d2, d3)}<br>    Output.append(Vk -Ek);<br>    Selector.append(j);<br>} |     Selector.next( )<br>}<br>while (more encoded data) {<br>// retrieve the next estimator selection<br>    estimateType = Selector.next( )<br>// retrieve the next encoded value<br>    Ek = Input.next( )<br>// reconstruct the next vertex<br>    switch (estimateType) {<br>    case ZERO:<br>        Vk = Ek + Vk-1<br>    case ONE:<br>        Vk = Ek + Vk-1 −Vk-2 + Vk-3<br>    case TWO:<br>        Vk = Ek + Vk-1 + Vk-1 −Vk-2<br>    case THREE:<br>        Vk = Ek + Vk-1 + Vk-2 −Vk-3<br>    }<br>} |

Other embodiments of the present teaching will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of encoding a position of a current vertex, said method comprising:
    determining a set of candidate predictions calculated from multiple vertices that preceded the current vertex;
    determining respective errors between the candidate predictions in the set of candidate predictions and the current vertex;
    selecting one of the candidate predictions for the current vertex based on its respective error; and
    encoding, by a processor, the current vertex as information indicating a correction vector between the current vertex and the selected candidate prediction and information indicating the selected candidate prediction,
    wherein the set of candidate predictions is calculated from the multiple vertices that preceded the current vertex by determining the position of the multiple vertices in a traversal order.

2. The method of claim 1, wherein determining the set of candidate predictions comprises:
    setting a first candidate prediction equal to a vertex that immediately preceded the current vertex; and
    calculating additional candidate predictions based on vertices that earlier preceded the current vertex.

3. The method of claim 1, wherein determining the set of candidate predictions comprises:
    setting a first candidate prediction equal to a vertex that immediately preceded the current vertex; and
    calculating additional candidate predictions based on the next two vertices that earlier preceded the current vertex.

4. The method of claim 1, wherein determining the set of candidate predictions calculated from multiple vertices that preceded the current vertex comprises determining the set of candidate predictions based on a set of mathematical combinations of correction vectors calculated from multiple vertices that preceded the current vertex.

5. The method of claim 1, further comprising outputting the current vertex.

6. The method of claim 1, wherein the encoding the position of the current vertex is used in a geospatial data system.

* * * * *